Nov. 10, 1959   F. W. LESS ET AL   2,912,402
SHELL MOLDING COMPOSITION COMPRISING THERMOSETTING
PHENOL-FORMALDEHYDE RESIN, COATING AGENT, AND
SAND, AND PROCESS FOR MAKING SAME
Filed Sept. 8, 1954

INVENTOR
Frank W. Less, Eugene C. Roeck and Jay C. Searer
BY
Bailey, Stephens & Huettig
ATTORNEYS

United States Patent Office 2,912,402
Patented Nov. 10, 1959

2,912,402

SHELL MOLDING COMPOSITION COMPRISING THERMOSETTING PHENOL - FORMALDEHYDE RESIN, COATING AGENT, AND SAND, AND PROCESS FOR MAKING SAME

Frank W. Less, Kenmore, Eugene C. Roeck, Buffalo, and Jay C. Searer, Snyder, N.Y., assignors, by mesne assignments, to Hooker Electrochemical Company, Niagara Falls, N.Y., a corporation of New York Application September 8, 1954, Serial No. 454,702

9 Claims. (Cl. 260—30.6)

This invention relates to the making of molds and cores. More specifically it refers to a new composition and method therefor for use in making such molds and cores.

In FIAT Final Report No. 1168, entitled, "The C Process of Making Molds and Cores for Foundry Use," by William W. McCulloch, Office of Technical Services, May 30, 1947, there is described a process for making foundry molds which utilizes a mixture of sand and a thermosetting resin, specifically a mixture of phenolic resins and hexamethylene tetramine. More recently a variation of the process has been developed which is based upon the traditional method of blowing sand cores by means of an air pressure type of blowing machine. In this new method a mixture of sand and phenolic resin is placed in the charge chamber of a core-blowing machine, and the mix is injected under air pressure into an enclosed heated pattern. The mixture then fills the cavity under pressure and is later cured with the application of heat, so that the surfaces of the mold conform to the interior surfaces of the pattern cavities.

There are many advantages to be gained by utilizing the core blowing method in conjunction with the shell mold process. First, internal molds or cores can be produced as well as external molds. In the Croning or dumping process only external molds can be readily formed. Second, shell molds may be produced having a uniform thickness since the sand mixture is blown into a confined or predetermined cavity. In the Croning or dumping process the thickness is determined by the dwell time and temperature conditions, which are difficult to control precisely. Third, both surfaces of the mold can be contoured in the blowing process. In the Croning process only the side in direct contact with the heated pattern can be contoured, and the back part must remain irregular since the blown mold is formed in a confined space, a mold possessing 100% definition is produced. Fourth, the amount of the materials needed for producing the core or mold may be more readily predetermined in the blowing method since the thickness of the mold or core is known in advance. In the Croning process this is not possible as it is impossible to predetermine the exact temperature or dwell time. Fifth, the internal molds or cores may be made hollow by first filling the pattern cavity and then allowing the unused portion to run off. Sixth, since external molds produced by the blowing process can be formed having a predetermined contour on the reverse side, they can be adapted to the permanent type of mold support. This enables use to be made of positive methods to back up the mold, thus preventing mold fracture during the casting operation.

Other advantages of the blowing process can be seen when the limitations of the Croning process are considered. For instance, in the Croning process, after the mix has been in contact with the heated pattern sufficiently long to form a mold of desired thickness, the pattern and the excess sand are inverted so that the excess sand can fall off. At this point there is a tendency for the mold to fall off the pattern. To prevent this, special resins are used which are less fluid than would normally be desirable. The fall-off of the mold is thus prevented, but the use of a resin that has a lower fluidity results in a finished mold that has less strength than one made with a more fluid resin. When molds are produced by the blowing process, this problem does not exist since the mold is completely contained in the pattern until it has completely cured. Since there is no fall-off problem, resins which are more fluid can be used which in turn produce stronger shell molds.

Another advantage of the blowing method resides in the fact that the method may be used for preparing molds for stack pouring, since both surfaces of the mold may be contoured and cured. Stack molds consist of a cope patterned on one surface and a drag for the succeeding mold on the other surface. The molds are then assembled in groups and may be poured with a common sprue. In the dumping process only one surface may be contoured. As a result it is impossible to produce molds directly for stack pouring.

A saving in time also results through the use of the blowing method since patterns may be filled almost instantaneously and removed from the blowing machinery into a furnace to be cured. In the dumping process the sand mold mixture must remain in contact with the pattern for a sufficient length of time to form a mold of desirable thickness before the excess sand is dumped off and the mold removed to be cured.

These many advantages of the blowing process at first could not be realized, since the material used in the dumping or coating process was not completely suitable for use in blowing shell molds or cores. The molding material as used in the original coating process consisted of a mixture of sand and finely powdered resins. This mixture was made by placing sand and resin containing admixed hexamethylene tetramine into a mixer and mixing it thoroughly for several minutes. However, since the resin is very finely ground, a problem has always existed in that the finely ground resin tends to disperse through the air when the material is manipulated, creating considerable clouds of dust and destroying the uniformity of the mixture. Our prior applications, Serial No. 220,700 and 220,704, filed April 12, 1951, both now abandoned (said applications Serial No. 220,700 and 220,704 being themselves continuations-in-part of our application Serial No. 135,316, filed December 27, 1949, now abandoned), of which this application is a continuation-in-part, disclose the use of a liquid additive to prevent the resin from being segregated. Although this material in the proportions disclosed and claimed in the aforementioned application aids materially in decreasing the amount of resin dust from blowing around, it still does not produce a material that is entirely suitable for use in the blowing process. It was found that when this mix is used the resin still segregates from the sand to some degree during the blowing process. When the mixture is carried in the air stream some of the resin becomes separated from the sand particles and forms low and high resin concentration areas within the mold, resulting in the production of a weak mold. In the areas where the resin is dense, the mold gases cannot permeate the shell wall and become trapped. This results in the creation of gas pockets in the casting. A quicker burnout may result in these high resin concentration areas to produce a defective casting. Uneven distribution of the resin also results in uneven permeability in the mold. In addition the resin powder has a tendency to concentrate on the pattern surface and at the blow and vent holes. The maximum degree of segregation of resin appears to lie in the most turbulent areas inside the pattern.

In attempting to solve this problem it was discovered that if a continuous resin coating could be applied to each sand particle, there would be no segregation taking place during the blowing process. In addition, it was discovered that a lower percentage of resin could be used in a mixture which would still give tensile strength comparable to molds made with uncoated mixtures containing greater percentage of resin.

A number of methods for producing the uniform coating upon the sand particles have been tried by various workers in the field with more or less success. One method consists in mixing the sand with a solution formed by dissolving powdered resin in a solvent, and then driving off the solvent, generally with the addition of heat. One disadvantage of this method is that it is difficult to get the solvent out of the mixture after the mixing process is complete. The solvent evaporates rapidly at first, but, after the viscous stage is reached, the evaporation is accomplished only with extreme difficulty. Another disadvantage of this process is that there is a tendency for the resin to be pulled off the sand particles. This results in a nonuniform mix. Another disadvantage is that the mixture formed remains quite tacky. The cured molds formed have low tensile strength because the resin coating does not adhere well to the sand particles.

The second method uses a series of steps very similar to the process used for producing grinding wheels. A liquid resin is first mixed with sand. Then the powdered resin is added and partially succeeds in drying the mixture. The main disadvantage with this method is that the mixture has green strength, that is, it is quite sticky, lumps, and forms a permanent set when pressure is applied. This makes it very unsatisfactory for use especially in the blowing process where a free-flowing mixture is required. In addition the resin content must be necessarily high in this method in order to achieve suitable tensile strengths in a mold.

The third method, in contrast to the two mentioned above, is a cold-coating method and consists of mixing the sand with a liquid resin and a small amount of solvent. The material is then dried by adding hexamethylene tetramine and wax. The disadvantages of this method are that this material also has green strength and packs, making it unsatisfactory either for normal shell mold use, or for shell mold or core blowing.

The fourth method consists in mixing the sand and the liquid resin together at a high temperature, and then adding hexamethylene tetramine to advance the resin. This method is difficult to accomplish and requires expensive equipment for heating the mixing ingredients which most foundries do not have available. Another disadvantage is that, during the period when the hexamethylene tetramine is added, the resin is continuously being advanced. Therefore, elaborate equipment is required to control the process in order to get a material which is advanced to the same degree as any previous batch which has been made by this process.

The fifth method consists in mixing sand with a fused resin at high temperature, forming a coating, and then cooling the mixture and pulverizing it. This method also requires expensive equipment and is time-consuming and costly.

It is an object of the present invention to provide a composition which is suitable for the manufacture of shell molds and cores by means of the air-blowing process.

It is a further object of this invention to provide such a composition which can be rendered uniform and which will remain uniform throughout the blowing process and which does not require the use of special and complicated mixing equipment.

It is another object of the invention to provide such a composition which can be produced and used without causing formation of dust, so that the danger of health and safety involved in the manufacture of the known mixtures is eliminated.

Still a further object of the present invention is to provide a method for preparing a shell mold composition wherein each sand particle is substantially coated with resin, and wherein there remain essentially no resin particles in the mix which might segregate when blown about by the air currents.

Further objects and advantages of the invention will appear more fully from the following description, especially when taken in conjunction with the accompanying drawings which form a part thereof.

Figure 1:
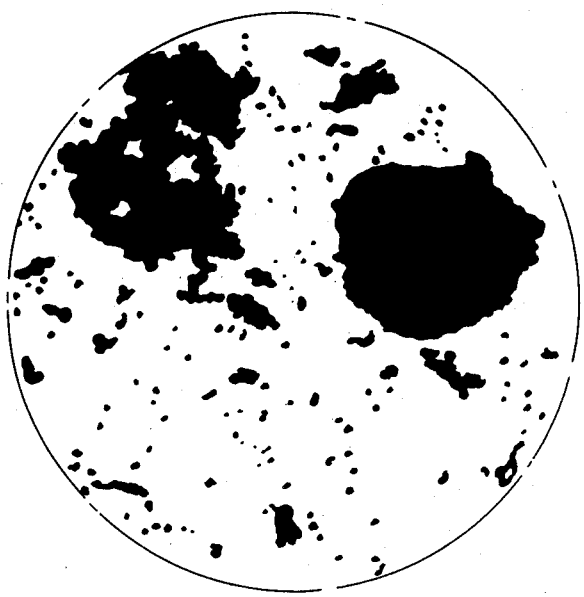
Fig. 1 shows on a greatly enlarged scale a composition of the type produced by the normal admixing of sand and resin.

In our pending applications, a method has been disclosed and claimed for avoiding some of the disadvantages of a dry sand and resin mix in which a liquid adhesion agent is added to cause the resin particles to cling to the grains of the sand. This process contributes materially in eliminating the dust problem. However, this material as disclosed in the prior applications still was not entirely satisfactory for use in the sand blowing process, since the high degree of turbulence in the air stream succeeded in segregating some resin even from this mix to such an extent that the remaining mixture did not always form satisfactory blown molds and cores.

It has now been discovered that sand particles may be substantially completely coated with a film of resin without any external application of heat by incorporating into the mix a specified amount of a properly selected liquid coating agent, if the ratio of coating agent to resin is kept within well defined limits.

The compound used as the coating agent may in many cases be the same compounds as disclosed in our pending applications Serial Nos. 220,700 and 220,704.

The liquid used in our co-pending application was used in a ratio of less than 1:10 to the weight of resin. It was therefore unexpected to find that if the ratio was increased to one greater than 1:10, the liquid would act as a coating agent and effect a susbtantially uniform coating of resin surrounding each sand particle which would not segregate from the mixing during physical manipulation. It has been found that when the ratio of coating agent to resin lies in the range of 1:10 to 4:10 a resin coated sand is produced by the present process which is satisfactory for shell and core blowing and which is equally satisfactory for use in the Croning or dumping process. Where the ratio is lower than 1:10, an effective coating will not be produced. Where the ratio is greater than about 4:10, although a coating will be produced, the resulting mixture is somewhat too sticky and has green strength, so that it is no longer satisfactory for use in the blowing process.

The liquid used as a coating agent should possess certain properties. First it must have a relatively high boiling point in order to produce mixes which have good storing properties under normal room conditions. Second, it must exhibit a limited solubility in the resin used. It must not be a very good solvent for phenolic resins, nor can it be a complete non-solvent at room temperature. It was found that some liquids have too high a solubility in the resin used, so that a mix made therefrom becomes sticky, cakes, and fails to flow freely when used in the mold blowing process. On the other hand, there are those compounds which are not sufficiently soluble in the resin, resulting in the complete absence of any coating action. Between these two groups lies a third group comprising a large number of compounds which are slightly soluble in the resin and which soften it to the extent only that the resin is able to form a coating about each sand particle and adhere thereto.

In view of the fact that the present invention depends upon the physical properties of the various compounds used as coating agents rather than any chemical or functional property, and since the operative materials do not appear to fall into any particular chemical class of compounds based on the functional groups, it became necessary to formulate a method for defining which compounds were operative and which were not, based on their physical properties. It was found that the coating agent first of all had to exhibit those properties listed above. It was then found necessary to work out a method to define empirically what compounds exhibited the desired solubility in phenolic resins such as to be operative in coating the resin upon sand, and yet which was not so soluble that it produced a sticky mixture. The following method was developed.

First, a phenolic resin was prepared to use as a reference standard. For this purpose a novolac type of resin was chosen, that is, one which did not have sufficient formaldehyde contained therein to form a thermosetting resin upon application of heat. It was necessary to use such a resin in order to prevent any advancement of the resin during the testing. The resin was prepared by reacting 0.8 mol of formaldehyde with 1 mol of phenol using sulfuric acid as a catalyst in the usual method for making a phenol formaldehyde novolac resin. The resin had a melting point of about 80° C. shrink and about 90° C. clear. The reference standard resin was then mixed with measured amounts of the various agents to be considered for use as coating agents and the mixture was heated until a uniform product formed. The melting points of these resulting mixtures were then measured by each of two different methods, and the melting point depression produced by the addition of each agent was determined. The various agents were then utilized in the coating process and tests made of the resulting mix to determine the tensile strength of the various finished molded materials. The table listed below shows the various compounds used as coating materials and the resulting melting point produced when mixed with the standard reference resin.

MELTING POINTS

|  | Shrink, °C. | Clear, °C. |
| --- | --- | --- |
| Resin | 79 | 90 |
| Tricresylphosphate | 63 | 76 |
| Dimethylformamide | 44 | 57 |
| Glycerine | 46 | 58 |

In the tests resulting in the data listed above 16% by weight of each coating agent based on the resin was mixed with the standard reference resin. The resin used in every case was a novolac resin as described above. The mixture was heated until the resin melted, and then the liquid resin and the coating agent were mixed together until a homogeneous liquid resulted. This was then allowed to cool and the melting point of the resulting mixture was determined. The data above show the resulting melting points as determined by two different methods, the shrink method and the clear method. The melting point determinations were made in a capillary tube. The shrink temperature is the temperature at which the powder begins to shrink away from the tube. The clear temperature is the temperature recorded at the point where the opaqueness of the material within the capillary tube disappeared and where the transmitted light through the capillary tube indicated clarity.

The values for the tensile strength were determined by mixing with sand about 4/10 of one percent (0.4%) of the coating agent and 2½% of a commercial shell mold powdered resin such as Durez 17060 (a phenolformaldehyde resin with 10% of hexamethylenetetramine). The prepared mix was then made into shell molds both by the dumping process and by the blowing process, and the tensile strengths recorded.

From the above tests it was found that materials which are relatively insoluble in phenolic resins like kerosene did not even form a homogeneous medium when mixed with the standard reference resin. This material also was not satisfactory in coating the resin upon the sand particles. Tricresylphosphate was very satisfactory in coating the resin and produced molds having satisfactory tensile strengths. Materials such as dimethylformamide and glycerine, although they succeeded in coating the resin upon the sand, produced sand-resin mixes which were rather sticky and which lumped upon the application of pressure. These materials were used only with some difficulty. Materials which were more soluble in phenolic resin and as a result depressed the melting points to a greater degree than glycerine were found to be unsatisfactory for producing coated sand for the shell mold processes described above.

From the results of the tests outlined above, it was determined that those liquids which when mixed in the proportions as outlined above with a standard reference phenolic novolac which melts at about 80° C. by the shrink test or 90° C. by the clear test will depress the melting point not more than about 30° C. are satisfactory for coating resins in the process of the present invention. Those materials which, when tested in the same way produce a melting point depression greater than about 30° C. have been determined to be unsatisfactory for the process. Materials completely incompatible with phenolic resins are also, of course, unsatisfactory.

The term "standard reference phenolic resin having a melting point of about 80° C." as used in the claims refers to a novolac resin of the type described above.

In order to accomplish a satisfactory coating of the sand, the ratio of the coating agent to the powdered resin must be controlled within rather close limits. In order to get any coating at all, it is generally necessary that at least 1 part of coating agent to 10 parts of powdered resin by weight must be used. The ratio of the coating agent to resin may be increased until the value reaches 4 parts of coating agent to 10 parts of resin, beyond which point the resin-sand mixture formed will be too wet and sticky for satisfactory shell blowing.

The amount of resin usually used based on the total mixture generally is in the range of 1% to 10%. Mixes containing less than 1% resin do not form molds with satisfactory tensile strengths. Mixes containing greater than 10% resin may be used but become commercially uneconomical. The range of the coating agent generally varies from 1/10% to 4% by weight based on the total mixture.

Although individual compounds have been described for use as coating agents, it is to be understood that mixtures of two or more compounds, which mixtures themselves exhibit the properties described above as desirable, may be used.

The process of the invention is generally carried out by placing the sand in any one of several types of mixers commonly used in foundry work. Examples of these are: the Beardsley-Piper speed muller and the Simpson muller. The coating liquid is then slowly added to the sand while the mix is kept in motion. After approximately five minutes, the resin is added, and mixing is continued for a period of from 5 to 30 minutes depending on practical considerations. When a mixer has not been used for a considerable period of time and is therefore at room temperature, the first coating run may require a greater mixing period than when the mixing equipment has attained a higher than room temperature due to the heat resulting from the friction of mixing from the past operation. After several runs, mixing may be accomplished in as short a period as 5 minutes. After the necessary mixing period has been carried to completion, the sand is removed from the mixer and then can be utilized in the moldmaking operation.

Figure 2:
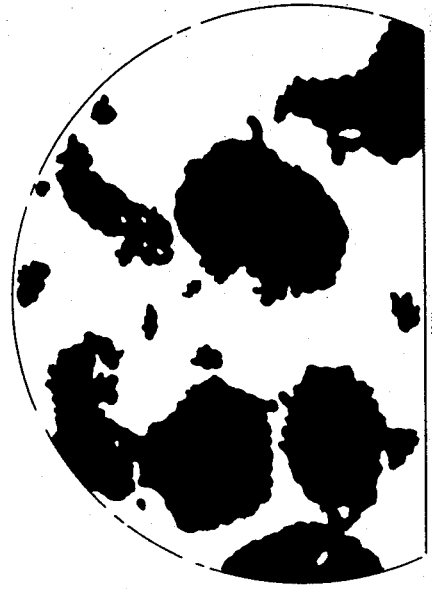
Fig. 2 shows a mix prepared in accordance with our prior applications Serial Nos. 220,700 and 220,704.

The effects of the process of the present invention upon sand mixes may be illustrated by means of photomicrographs of the mixtures, representations of which appear in Figs. 1 to 4. Fig. 1 shows a mixture of sand and resin such as is generally used for the Croning process. It will be noted that the resin and the sand exist completely apart from each other and that the resin is free to segregate when any motion of the mixture takes place. Fig. 2 shows a mixture such as prepared by the process disclosed in our co-pending applications Serial Nos. 220,700 and 220,704, which disclose a process for preparing a molding mix in which the dusting problem has been considerably alleviated. It will be seen that a large part of the resin loosely adheres to the sand particles, but that considerable resin remains apart from the sand grains and is free to segregate. In this coating process a coating agent to resin ratio of less than 1 to 10 was used.

Figure 3:
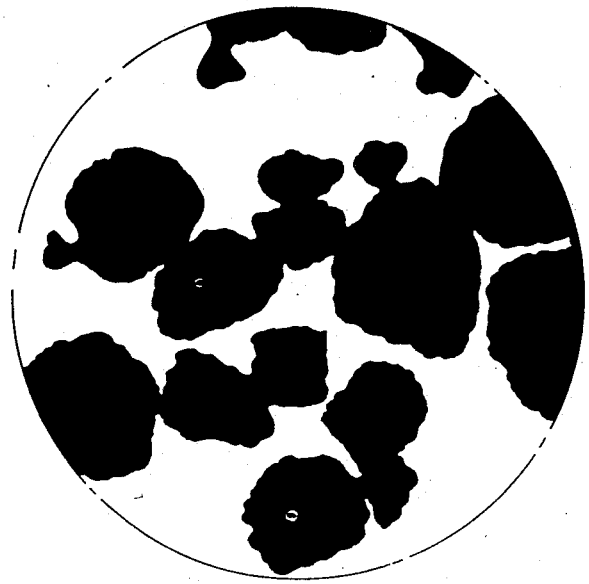
Figs. 3 and 4 show compositions prepared in accordance with the present invention.
Figure 4:

Fig. 3 is a representation of a photomicrograph taken of a mixture made according to the present invention in which 0.4% of coating agent and about 2½% to 3% of resin were used. As seen through the microscope, there are no discreet particles of resin visible in the field, indicating that the resin must have formed a continuous coating about each sand particle. This is the optimum type of mix to be obtained by the process of the present invention and results in shell molds and cores having maximum strength. The mix thus illustrated was prepared in a Beardsley-Piper speed muller. When this same mix is prepared in a mixer such as the Simpson muller, where the energy and speed of rotation are not nearly as great as that of the Beardsley-Piper muller, a mix as shown in Fig. 4 results. Here the sand particles are substantially coated with resin, but there still remain discreet particles visible which adhere to the surfaces of the sand particles. Almost no resin particles are shown in the field indicating that the mixture will not be subject to segregation of the resin particles during motion.

As used in the present application in both the specification and claims, the term "coated sand" applies to material as illustrated in either of Figs. 3 and 4 depending on the type of mixing equipment used. Either type is satisfactory for use in either the blowing process or the dumping process. Mixes may be made in the slower type of mixer such as the Simpson muller having the completely coated composition of Fig. 3 by increasing the mixing period and thus developing more internal heat during the coating process.

The relative amounts of the coating agent and the resin used depend to a large extent upon the type of sand used to make the shell mold mix. It is generally customary, because of high transportation costs, for foundries to use that type of sand that is found in their locality. It is therefore necessary to alter proportions somewhat to adapt the process of the present invention to fit the conditions determined by the properties of the local sand. For instance, with a sand having large grains and a smooth round surface, such as Wedron No. 60 sand as sold by the Wedron Silica Company, as little as 0.1% to 0.4% of the coating agent may be used. To maintain the correct coating agent to resin ratio it has been found necessary to reduce the amount of the resin to about 1% to 2.5%. However, when a sand containing many small particles with irregular surfaces, such as Juniata, is used, it is necessary to use as much as 0.7% to 1.5% of the coating agent in order to accomplish the coating of the sand. The proper proportions for other sands generally fall in the range between 0.2% and 1.5%.

The materials which have generally proven to be most useful as coating agents in practicing the present invention are generally to be found among the classes of compounds which are used as plasticizers for various resins. Some examples are: tricreslphosphate, triethylphosphate, tributylphosphate and other compounds having similar properties. In addition to the compounds listed above, mixtures thereof or related compounds may be used.

Although the present invention has been described mainly in relation to its usefulness in the mold and core blowing process, it is equally useful in the Croning or dumping process in that the dusting problem and its attendant health hazards have been completely eliminated and the resulting cured molds generally have a more uniform composition and as a result a greater tensile strength for the amount of resin used.

The following examples will serve to illustrate the process of the present invention and the improvements resulting therefrom:

*Example I*

300 lbs. of Wedron No. 60 sand were placed in a Beardsley-Piper speed muller. The muller was started and 1.35 lbs. of tricresylphosphate were slowly added. Mixing was continued for about 5 minutes, at which time the muller was stopped and 7.5 lbs. of a powdered thermosetting resin, comprising a mixture of 90% phenol-formaldehyde resin and 10% hexamethylene tetramine, powdered to a fineness of 200 mesh were placed in the mixer. The mixer was started and allowed to run for 15 minutes. At the end of that time the mixture appeared to be free flowing and exhibited no tendency for spreading resin dust. Photomicrographs taken of samples of the mixture showed the complete absence of discrete particles of resin in the mix. Fig. 3 is a representation of these photomicrographs. Because of the absence of any discrete particles in the mix, it must be assumed that the resin formed a uniform coating about each particle of sand. Test molds were made of the material in order to test its effectiveness in the shell mold process. The molds made by the dumping process had a tensile strength of about 263 p.s.i. and those by the blowing process, a tensile strength of about 442 p.s.i.

*Example II*

50 lbs. of Wedron No. 60 sand were placed in a Simpson type muller. While mixing 0.25 lb. of tributyl phosphate was slowly added. Mixing was continued for approximately 5 minutes, at which time 1.25 lbs. of a finely ground mixture containing about 90% phenol-formaldehyde resin and about 10% hexamethylene tetramine were added and mixing was continued an additional 5 minutes. After the end of that period, the mixture was free flowing and exhibited no tendency for producing resin dust. Photomicrographs, of which Fig. 4 is a representation, were taken of samples of the mix and showed no loose resin particles unattached to the sand particles. Although the sand particles appeared to be substantially coated with resin, a small number of discrete particles can be seen adhering to the sand. Despite the lack of a uniform, smooth coating, the material was found to be as effective as the material produced by the speed muller as described in Example I and shown in Fig. 3. The tensile strength of blown test molds was 439 p.s.i.

It was found that when mixing was continued for a longer period, and when the temperature of the mixture was allowed to rise due to the heat generated by friction, a mixture could be obtained having the same completely coated appearance as the mixture produced in Example I in the Beardsley-Piper speed muller. The above two examples illustrate the difference in effect produced by various types of mixers. In general, in order to achieve a completely coated product in a short time, it is necessary to use a high speed mixer. However, when such a mixer is not available, the slower type may be used to produce a product which, although it does not exhibit a completely coated appearance, is satisfactory for use in the blowing process for making shell molds and cores. Where the completely uniform coating is desired, it may be obtained even with the low speed mixer by increasing the mixing period and allowing the temperature to rise.

*Example III*

300 lbs. of Wedron No. 60 sand were placed in a Beardsley-Piper speed muller. The muller was started and 1.4 lbs of triethyl phosphate were slowly added. Mixing was continued for about 5 minutes, at which time the muller was stopped and 7.5 lbs. of the thermosetting resin described above were placed in the muller. The muller was started and allowed to run for 15 minutes, at the end of which time the mixture appeared to be free flowing and exhibited no tendency to spread resin dust. The mix thus prepared was used to make test molds by the blowing process, and the resulting test cores had a tensile strength of about 450 p.s.i.

Although the preferred compounds for use as coating agents have been described above, other esters of phosphoric acid such as cresyl diphenyl phosphate, diphenyl octyl phosphate, tri (p-tert-butyl phenyl) phosphate, triphenyl phosphate and diphenyl mono-o-xenyl phosphate.

Although the present invention has been described with a certain degree of particularity, it is understood that the present disclosure has been made only by way of example, and that numerous changes in details of composition and procedure may be resorted to without departing from the spirit and the scope of the invention as hereinafter claimed.

We claim:

1. A free flowing, blowable mold forming composition consisting essentially of a major proportion of sand, a minor proportion but at least 1% of a powdered phenol formaldehyde thermosetting resin, and a liquid coating agent causing the resin to form a substantially uniform coating about each sand particle after mixing, said coating agent being a liquid which is an organic ester of phosphoric acid, the ratio of said coating agent to said resin being in the range of 1:10 to 4:10 by weight.

2. A free flowing, blowable mold forming composition consisting essentially of a major proportion of sand, a minor proportion but at least 1% of a powdered phenol formaldehyde thermosetting resin, and a liquid coating agent causing the resin to form a substantially uniform coating about each sand particle after mixing, said coating agent being a liquid selected from the group consisting of tricresyl phosphate, tributyl phosphate, triethyl phosphate, cresyl diphenyl phosphate, triphenyl phosphate, tri (p-tert-butyl phenyl) phosphate, and diphenyl mono-o-xenyl phosphate, the ratio of said coating agent to said resin being in the range of 1:10 to 4:10 by weight.

3. A composition as claimed in claim 1 in which the coating agent is tricresyl phosphate.

4. A composition as claimed in claim 1 in which the coating agent is tributyl phosphate.

5. A composition as claimed in claim 1 in which the coating agent is triethyl phosphate.

6. A composition as claimed in claim 1 in which the coating agent is triphenyl phosphate.

7. A composition as claimed in claim 1 in which the coating agent is cresyl diphenyl phosphate.

8. A free flowing, blowable mold forming composition consisting essentially of a major proportion of sand, a minor proportion but at least 1% of a powdered phenol formaldehyde thermosetting resin, and a liquid coating agent applied to the surface of the sand particles which, when admixed in a mechanical mixing device, causes the resin to form a substantially uniform coating about each sand particle, said coating agent being a liquid organic ester of phosphoric acid, having a boiling point greater than 100° C. and which, when mixed in a ratio of about 1:5 and heated together with a reference novolac resin having a melting point of about 80° C. by the shrink test, and when heated to a temperature greater than the melting point of the resin, forms a homogeneous mixture with the resin, the melting point of which mixture is not more than 30° C. below the melting point of the standard reference resin, the ratio of said coating agent to said powdered thermosetting resin being in the range of 1:10 to 4:10 by weight.

9. A process for producing a molding composition as claimed in claim 1 wherein each sand particle is substantially coated with a uniform coating of resin which comprises mixing together a major proportion of sand and from 0.1% to 4% by weight of a coating agent which is an organic ester of phosphoric acid, adding a minor proportion but at least 1% of a powdered phenol formaldehyde thermosetting resin, the ratio of said coating agent to said resin being in the range of from 1:10 to 4:10 by weight, and continuing the mixing process until a substantially uniform coating of resin has formed on each sand particle.

References Cited in the file of this patent

UNITED STATES PATENTS

| | | |
|---|---|---|
| 1,439,056 | Baekland | Dec. 19, 1922 |
| 1,856,371 | Baldwin | May 3, 1932 |
| 2,328,622 | Crawford | Sept. 7, 1943 |
| 2,435,858 | Whitehead | Feb. 10, 1948 |
| 2,446,872 | Ehlers | Aug. 10, 1948 |
| 2,521,614 | Valyi | Sept. 5, 1950 |